United States Patent
Bayer et al.

[15] 3,653,867
[45] Apr. 4, 1972

[54] DEVICE FOR UNITING THE EDGES OF A DOUBLE OR MULTIPLE GLASS PANE

[72] Inventors: Eduard Bayer, Hugo-Wolf-Str. 12B, Salzburg, Gneis, Austria; Willi Vogelbruch, In der Stufke 11, Sprockhovel, Germany

[22] Filed: June 1, 1970

[21] Appl. No.: 41,929

[52] U.S. Cl. .................................................. 65/156, 65/58
[51] Int. Cl. .............................................................. C03b 23/24
[58] Field of Search ................................. 65/36, 58, 152, 156

[56] References Cited

UNITED STATES PATENTS

| | | | |
|---|---|---|---|
| 2,999,337 | 9/1961 | Sharp | 65/58 X |
| 1,906,315 | 5/1933 | Davis et al. | 65/36 |

Primary Examiner—Arthur D. Kellogg
Attorney—Singer, Stern & Carlberg

[57] ABSTRACT

A device for uniting the edges of double or multiple glass panes in which the squeezing rollers engaging the edges of the glass panes comprise each two individual rollers which are independently rotatable. One pair of said individual rollers of the squeezing rollers engage opposite edges of said glass panes to be united and are spaced apart a distance equal to the thickness of the edge to be formed by the squeezing operation on the united glass panes. The other pair of said individual rollers of said squeezing rollers engage opposite faces of said two glass panes to be united adjacent said squeezed edges, and are spaced from each other a distance which is substantially equal to the thickness of the completed multiple glass pane.

8 Claims, 8 Drawing Figures

Patented April 4, 1972

Inventors
Eduard Bayer
Willi Vogelbruch
by Singer, Stern & Carlberg
ATTORNEYS

Patented April 4, 1972

Inventors
Eduard Bayer
Willi Vogelbruch by Singer, Stern & Carlberg
ATTORNEYS

DEVICE FOR UNITING THE EDGES OF A DOUBLE OR MULTIPLE GLASS PANE

The invention relates to a device for uniting the heated edges of glass panes to form the edge of a double or multiple glass pane. This device consists of two cooperating squeezing rollers which engage the outer surfaces of the glass panes to be united.

According to a known device for producing double glass panes made of two glass panes, the individual panes are continuously heated along the edges by burners to such an extent that these edges become moldable and thereupon these edges are squeezed together by squeezing rollers arranged behind the burners to form an edge of the double glass pane.

It was discovered that the edge of a so produced double glass pane, due to the movements of the panes relatively to the squeezing rollers, does not come to lie very often in the center plane between the double glass pane. This displacement of the edge may lead to difficulties when the glass panes are to be glazed, particularly when the margins of the different edges of the double glass panes are differently displaced with respect to one another a sufficient extent or when the margins of the individual edges are off-set. Furthermore, the thicknesses of the double glass panes in the neighborhood of the edge vary often so that difficulties are encountered during the installation of these glass panes. Furthermore, the optical properties of the double glass panes are sometimes impaired near the edge.

It is an object of the invention to improve this known device for producing double glass panes in such a manner that no harmful deviations or only very small deviation occur of the edge of the double glass pane from the center plane of the double glass pane. At the same time the deviations in the thicknesses of the double glass panes are to be eliminated to a far reaching extent.

In accordance with the invention, this object is obtained in that each squeezing roller consists of at least two individual rollers which are independently rotatable and of which one individual roller during the production of the double glass pane engages the marginal portions which are to be rolled together, whereby its distance from the corresponding individual roller of the other squeezing roller corresponds to the thickness of the edge of the double glass pane to be produced, while the other individual rollers engage the surfaces of the glass panes adjacent the produced edge of the double glass pane, whereby the distance between these other individual rollers from each other corresponds substantially to the thickness of the double glass pane to be produced. In this manner it is possible to arrange the edge of the double glass pane in the center plane of the double glass pane and the harmful deviations of the edge formerly produced are eliminated and it is now possible to glaze the double glass pane without difficulties. Furthermore, owing to the engagement of the second pair of individual rollers with the surfaces of the glass pane which are not deformed, the harmful occurring thickness variations which cause optical disturbances are eliminated.

According to a preferred embodiment of the device of the invention, the individual rollers of each squeezing roller are made cylindrical. Preferably, the individual rollers which engage the edges of the glass panes are provided with knurled circumferential areas, while the individual rollers engaging the outer surfaces of the glass panes are provided with smooth circumferential areas.

Another object of the invention is to arrange the individual rollers of each squeezing roller concentrically to one another on a common axis and provide the individual rollers with different diameters. In order to decrease the wear of the bearing faces of the highly heated rollers, it is preferred that the individual rollers having the greater diameter are provided with a pivot-type projection or with a collar on which the individual roller having the smaller diameter is rotatably mounted.

Still another object of the invention is to arrange the individual rollers of each squeezing roller on different shafts which are mounted on a common support. Such a construction permits a displacement of the individual shafts with respect to one another so that the production of double glass panes of different thickness is possible.

The invention will now be described in greater detail with reference to the accompanying drawings which illustrate by way of example different embodiments of the device of the invention.

IN THE DRAWINGS

Figure 1:
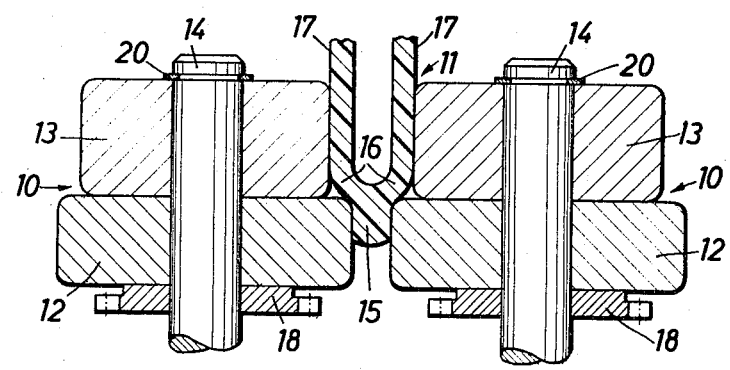
FIG. 1 illustrates in a vertical axial section a pair of squeezing rollers, each pair being arranged on a common shaft, whereby the sectional view is taken substantially along the line 1—1 of FIG. 2.
Figure 2:
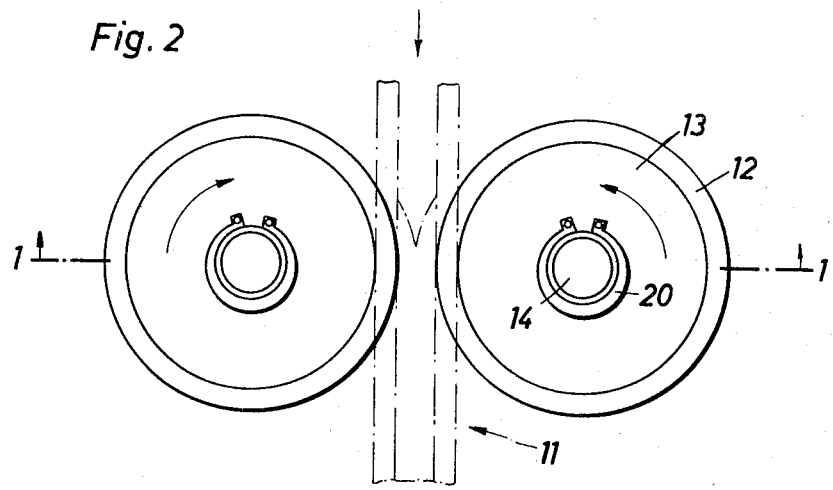
FIG. 2 is a top view of the pair of squeezing rollers illustrated in FIG. 1.

Referring to the FIGS. 1 and 2, a pair of squeezing rollers 10 is shown to be in engagement at the lower horizontal edge of a vertically positioned and horizontally movable double glass pane to be produced. Each squeezing roller comprises two individual cylindrical rollers 12 and 13 of which the individual rollers 12 have a larger diameter than the individual rollers 13. Both individual rollers 12, 13 of each squeezing roller 10 are rotatable on a common shaft 14 and are held on this shaft 14 by retaining rings 20. The distance of the two shafts 14 of the two squeezing rollers 10 from each other is so selected that the distance between the circumferences of the individual rollers 12 corresponds to the thickness of the edge 15 of the double glass pane 11 to be produced. The circumferential areas of the individual rollers 12 may be knurled. The individual rollers 13 have such a diameter that the distance between the circumferences of the same corresponds to the thickness of the glass pane to be produced. The circumferential areas of the individual rollers 13 are smooth. The height or the axial length of the individual rollers 13 is so selected that they engage the parallel outer surfaces 17 of the double glass pane 11 above the curved areas 16 disposed between the edge 15 and the outer surfaces 17 of the double glass pane 11.

Directly below the individual rollers 12 are arranged drive gear wheels 18 in axial alignment with the same. These gear wheels 18 are connected with the individual rollers 12 to drive the same. The individual rollers 13 are freely rotatable independently of the rollers 12.

Figure 3:
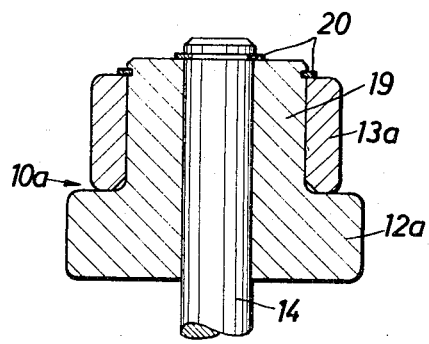
FIG. 3 illustrates a cross-sectional view of a modified construction of a squeezing roller.

FIG. 3 illustrates a modified embodiment of the squeezing roller 10a in which the individual roller 13a having the smaller diameter is not directly mounted on the shaft 14, but is freely rotatably mounted on a pivot-type projection or collar 19 of the individual roller 12a, which latter has a greater diameter than the roller 13a. According to this arrangement the bearing surface of the individual roller 12a on the shaft 14 is increased, while the bearing surface of the individual roller 13a on the roller 12a takes place on a bearing surface which compared to the one in FIG. 1 has a larger diameter. Since now the surfaces of the two bearings are substantially larger as the ones shown in FIG. 1, it is obvious that the wear on the bearing surfaces shown in FIG. 3 will be substantially less at the high temperature to which these bearing surfaces are subjected.

Figure 4:
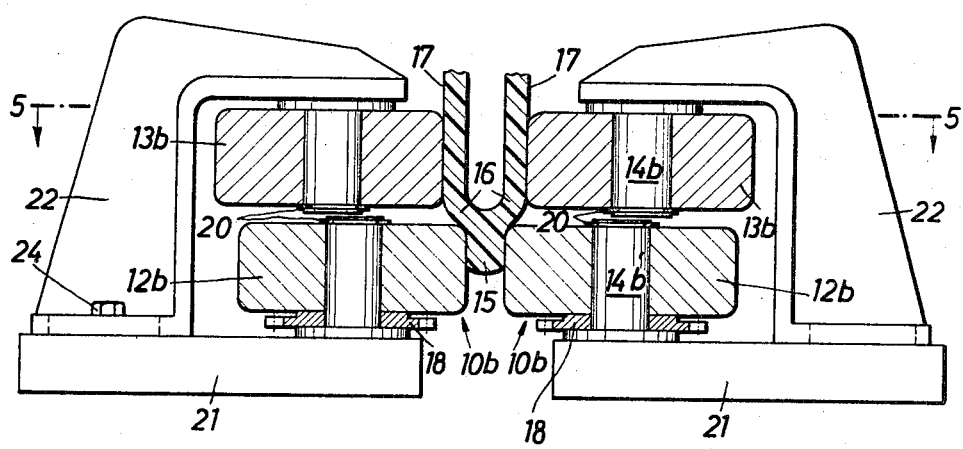
FIG. 4 illustrates a vertical sectional view of a pair of squeezing rollers, the individual rollers of which are mounted on different shafts. This view is taken along the line 4—4 of FIG. 5.
Figure 5:
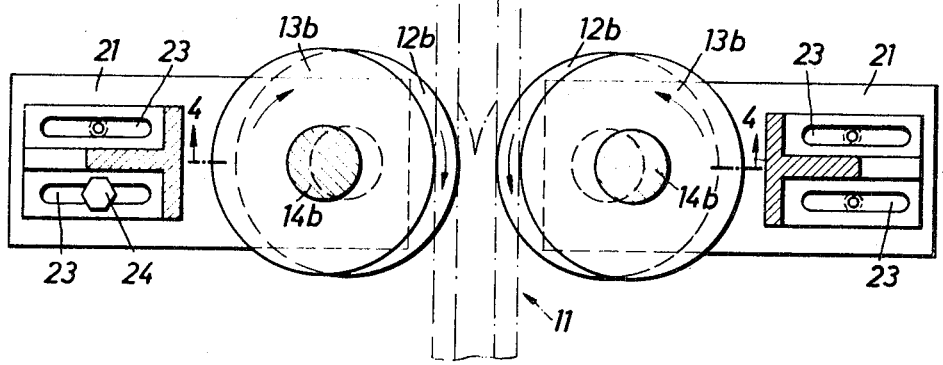
FIG. 5 is a top view of the pair of squeezing rollers illustrated in FIG. 4 substantially in the horizontal plane indicated by the line 5—5 in FIG. 4.

In the embodiment of the device of the invention illustrated in FIGS. 4 and 5, each pair of squeezing rollers 10b comprises the individual rollers 12b and 13b which are mounted on different shafts 14b and 14b' arranged in a plane at right angles to the plane of the glass pane. The different distance of the rollers 12b and 13b from each other is accomplished by employing different roller diameters, or as illustrated in the drawing, in which the roller diameters are the same, then the rollers are off-set in such a manner as shown by the position of the shafts 14b' and 14b. The shafts 14b' and 14b are secured to rigidly mounted yoke-shaped supporting members comprising lower base plates 21 and upper supporting angles 22. The shaft 14b' for the roller 12b is secured with its axis vertically disposed to the horizontal base plate 21, while the vertical shaft 14b for the roller 13b is secured on the horizontal leg of the supporting angle 22. In order to be able to slidably attach the rollers 12b and 13b, respectively, onto the shafts 14b' and 14b, respectively, the supporting angle 22 is detachably mounted to the base plate 21. The rollers are held on their respective shafts by retaining rings 20. The rollers 12b are driven by the drive gear wheels 18 mounted concentrically on the lower faces of the rollers 12b, while the rollers 13b are freely rotatable on their respective shafts 14b. The adjustment of the distance between the rollers 13b from each other is effected by a slidable displacement of the supporting angle 22 relatively to the base plates 21, so that double glass panes having different thickness may be produced. A base plate engaging flange of the supporting angles 22 is provided with slots 23 through which screw bolts 24 extend which secure the supporting angles 22 in the desired position on the base plates 21.

Figure 6:
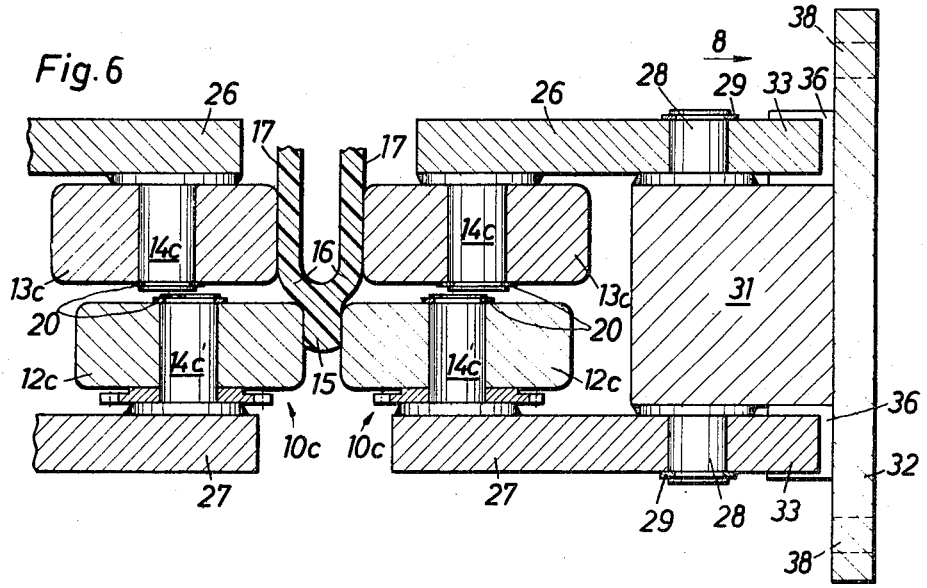
FIG. 6 illustrates a vertical sectional view of a pair of squeezing rollers mounted on rocking levers substantially along the lines 6—6 of FIG. 7.
Figure 7:
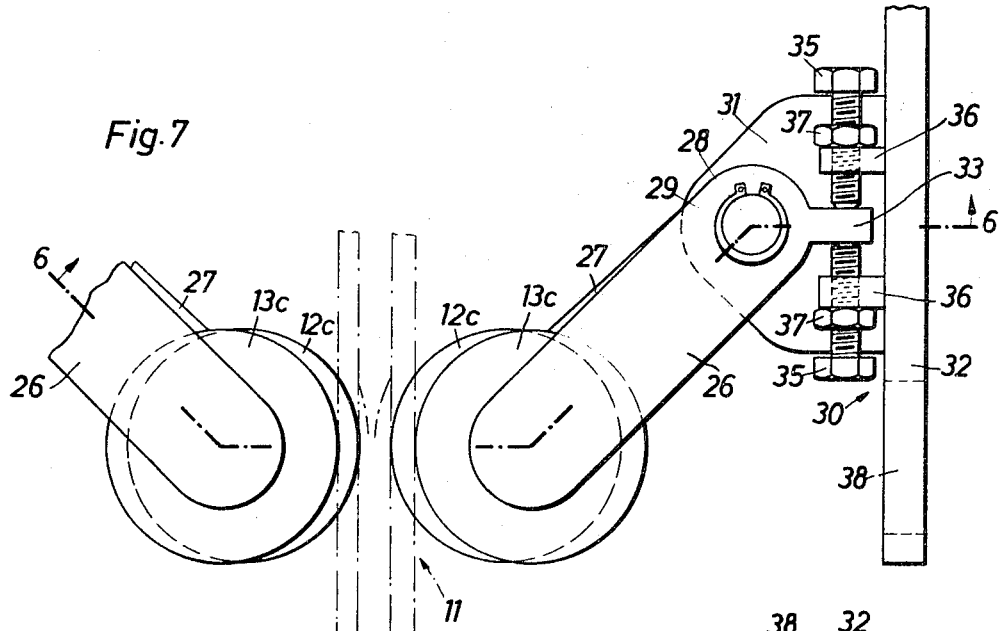
FIG. 7 is a top view of the pair of squeezing rollers illustrated in FIG. 6.

The FIGS. 6 and 7 disclose another embodiment of the device of the invention which also permits the production of double glass panes 11 of different thicknesses by means of pairs of squeezing rollers 10c. The individual rollers 12c and 13c are mounted independently of one another on pivotally mounted spaced parallel levers 26 and 27. The pivotal movement of the levers 26 and 27 takes place about pivot pins 28 which are arranged parallel to the shafts 14c and 14c' of the individual rollers 12c and 13c. The pivot levers are held on their pivot pins 28 by retaining rings 29. The pivot pins 28 are secured to the upper and lower side, respectively, of a supporting bracket 30 which consists of a horizontal pivot pin holder 31 and a vertical flange plate 32. The flange plates 32 are secured in the desired position in the oven through which the glass panes are conveyed in a horizontal direction. For the adjustment of the individual rollers 12c and 13c are provided adjusting devices which engage a projection 33 on the levers 26 and 27, respectively. The adjusting devices comprise screw bolts 35 mounted in threaded apertures in projections 36 provided on the supporting bracket 30. Counter nuts 37 on the bolts 35 serve for securing the screw bolts 35 in their adjusted position in which the same engage the projections 33 of the levers 26 and 27, respectively, so that an undesired pivotal movement of these levers is prevented. After loosening the counter nuts 37, the individual rollers 12c and 13c, respectively, may be adjusted independently of each other by the screw bolts 35.

Figure 8:
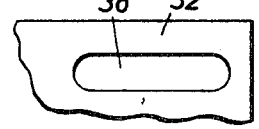
FIG. 8 is a partial view of the supporting bracket for the squeezing rollers illustrated in FIGS. 6 and 7 and viewed in the direction of the arrow 8 in FIG. 6.

An additional adjusting possibility of the squeezing rollers is possible by slidably adjusting the entire supporting bracket 30 in the direction of the conveying movement of the double glass pane as is shown in FIG. 8. According to FIG. 8, the flange plates 32 are provided with slots 38 which extend in the direction of the conveying movement of the glass panes, so that the entire support brackets may be adjusted as soon as the flange plate 32 has been loosen from the adjacent part of the oven by loosening securing screws (not shown) extending through the slots 38.

The squeezing rollers of the invention may be employed at the operating stations where the horizontal edges of the glass panes are welded together and also at the operating stations where the vertical edges of the glass panes are welded together.

What we claim is:

1. Device for uniting the heated edges of two spaced apart glass panes in the manufacture of multiple glass panes, said device comprising two cooperating rollers in engagement with the outer sides of said edges, said two rollers being rotatable about axes so spaced that the rollers, when moving relative to said edges, unite said edges by squeezing action, wherein the improvement comprises that each of said two rollers consists of pair of independently rotatable rollers, the first rollers of the two pairs engaging the outer sides of said edges for uniting them by squeezing action, whereas the second rollers of the pairs are spaced axially from said first rollers so as to engage the outer faces of the panes adjacent the produced edges at places where the distance between said outer faces substantially corresponds to the thickness of the multiple glass pane to be produced.

2. Device according to claim 1, in which the rollers of each pair of rollers are of cylindrical shape, and including means for positively driving the first rollers engaging the edge portions of the glass, and means for freely rotatably mounting said second rollers.

3. Device according to claim 1, in which the edge engaging first rollers of each pair of rollers are provided with a knurled circumferential area, while the second rollers of each pair have a smooth circumferential area.

4. Device according to claim 1, in which the first and second rollers of each roller pair are mounted concentrically on a common shaft and have different diameters.

5. Device according to claim 1, in which the first and second rollers of each roller pair are mounted concentrically on a common shaft and have different diameters, the first rollers having the larger diameter being provided with a pivot-type projection on which the second rollers having the smaller diameter are freely rotatably mounted.

6. Device according to claim 1, including common supporting brackets for each pair of rollers, and means for rotatably supporting the first and second rollers of each pair on said supporting brackets about different axes which are parallel to each other, and including means for adjusting one of said brackets relatively to the other for adjusting said device for making multiple glass panes of different thicknesses.

7. Device according to claim 1, including pivotally mounted levers, one for each said rollers for pivoting said rollers about axes which are parallel to the axes of rotation of said rollers, and means for locking said levers in their desired positions.

8. Device according to claim 1, including a support for each roller pair, and means for slidably adjusting said support in the direction of the relative movement between said to be united glass panes and said rollers.

* * * * *